July 8, 1941.   J. A. REINHARDT   2,248,285
SYNCHRONOUS ELECTRIC MOTOR
Filed Oct. 10, 1938   2 Sheets-Sheet 1
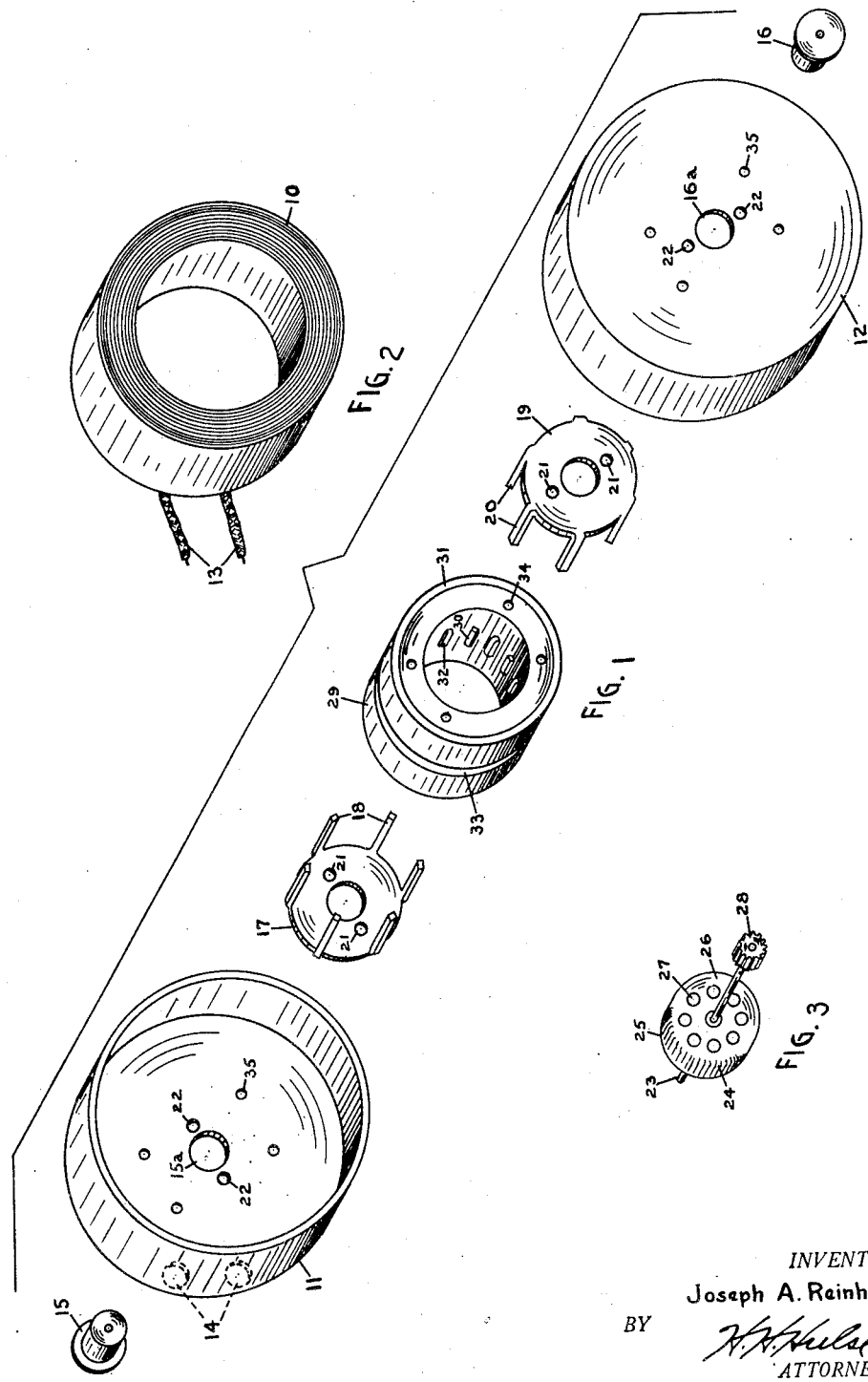
INVENTOR.
Joseph A. Reinhardt.
BY
ATTORNEY.

INVENTOR.
Joseph A. Reinhardt.
BY
ATTORNEY.

Patented July 8, 1941

2,248,285

UNITED STATES PATENT OFFICE 2,248,285

SYNCHRONOUS ELECTRIC MOTOR

Joseph A. Reinhardt, Peru, Ill., assignor to General Time Instruments Corporation, New York, N. Y., a corporation of Delaware Application October 10, 1938, Serial No. 234,174

7 Claims. (Cl. 172—278)

This invention relates to synchronous electric motors, and in particular to that type of single-phase motors which may be employed in the operation of electric clocks and other timing mechanisms.

The requisites of such a motor are that it be of compact and inexpensive construction, that it operate at comparatively low speed, and, in the event that the motor be self-starting, that it have a high starting torque.

My improved motor is of the so-called doughnut type; that is, the electromagnetic winding is ring-shaped, the rotor being positioned within the ring-shaped winding. Advantages accruing from the use of a rotor thus positioned are those of inexpensive construction, less inertia which results in quicker acceleration to synchronous speed and quicker response to variations in frequency of the alternating current, and light weight which results in longer life of the rotor shaft bearings and ability to operate with little or no lubricating oil for the bearings. The necessity for using oil to lubricate these bearings is considered to be a disadvantage because, due to the heat accompanying the operation of the motor and due to the dust which is often present, the oil soon becomes gummy thereby losing its lubricating properties and imposing an additional load on the motor.

By positioning the rotor within the ring-shaped field winding and by the use of such a winding, one is enabled to entirely enclose the winding and rotor in a dustproof housing which, if constructed of magnetic material of low remanence, serves the additional purpose of providing a low reluctance path for the flux generated by the winding and of providing means on which the field poles may be mounted. This contributes materially to the compactness, light weight, and simplicity of a motor constructed in accordance with my invention.

It is desirable that synchronous motors operate at as low a speed as possible to reduce wear on the bearings and to eliminate reduction gearing. In order to effect this result, it is necessary to provide as many field poles as possible, adjacent poles differing in phase by 180 electrical degrees. Although the use of a rotor of small diameter decreases the space available for each pole if the same number of poles is desired as could readily be provided in a motor having a rotor of greater diameter, it will be noted that a much smaller pole in the present construction will be as effective as a larger pole in the former construction for the reason that the flux density is correspondingly greater when the poles are positioned within the coil and take the place of the usual core.

If, however, in connection with a self-starting motor, it is desired to provide a series of shaded poles, or poles differing from their adjacent non-shaded poles by less than 180 electrical degrees, the lack of space available for the shading or phase shifting means renders it difficult to combine the advantages of a low speed motor with those of a motor wherein the rotor and field poles are positioned within a ring-shaped field winding.

Prior to my invention, shading has been effected by a short circuited coil of non-magnetic material surrounding the shaded pole, which often took the form of one or more preformed rings or stampings through which one or more poles have been inserted. In such constructions, a shaded pole is always separated from an adjacent non-shaded pole by the shading means in such a manner that a certain amount of angular space is taken up by the shading means which could be devoted to a larger pole, or to additional poles were it not for the shading. Although various constructions have been proposed to reduce the bulk of the shading means and thereby to reduce the angular space occupied thereby, it is impractical to reduce the cross-section thereof beyond a certain minimum. My construction contemplates the use of shaded poles which, while at their extremities they are closely adjacent to the unshaded poles and bear the same geometrical relationship to the rotor that the unshaded poles do, have an offset portion which is surrounded by the shading means, the angular space occupied by the shading means adjacent the offset portion being occupied by the unshaded poles at those places where the maximum number of poles is required.

Furthermore, I employ a novel means of shading both sets of shaded poles which comprises a single cast-metal shading means in which both sets of poles have been embedded. This not only prevents the vibration which is likely to occur between two sets of poles of opposite polarity, but also invariably determines the mechanical angular position of one set of poles with respect to the other and enables the assembly comprising shaded poles and shading to be constructed as a single unit, to be assembled with and to be adjusted with respect to the other elements of the motor as a unit. This type of shading, of course, may be used to advantage in a number of types of motors, and I do not confine myself to its application in the hysteresis motor herein described.

The rotor of my hysteresis motor is made of a material with a high hysteresis coefficient whereby a pole which has been induced in the rotor by a field pole will tend to resist reversal of its polarity when the polarity of the field is reversed. The effect of such a reversal of the field pole is to repel the induced pole in the rotor, or to attract an induced pole of opposite polarity. With a rotating field, such as that produced by my shaded field structure, a torque will be created by such repulsion and attraction of the induced poles in the hysteresis rotor.

It is essential that the rotor element, at the point where it co-operates with the field poles, be as thin as possible in order to increase the resistance to eddy currents which are present during acceleration of the rotor to synchronous speed. For this reason, the construction herein described is particularly well adapted for use with a hysteresis motor, the use of an exceedingly thin rotor member being permitted by the positioning of the rotor within the ring winding to co-operate with field poles projecting inwardly therefrom, rather than, as in the usual construction, by employing a rotor of larger diameter which co-operates with field poles positioned at the outer periphery of the ring winding. For a rotor of sufficient rigidity to resist the vibration caused by the field it will be seen that the smaller the diameter of the rotor, the thinner may be the material from which the rotor may be formed.

It has further been found that the combination of a hysteresis rotor with a rotating field wherein there are provided two sets of shaded poles as contrasted with one set, that is, a field having shaded poles of both polarities as contrasted with one having shaded poles of only one polarity, produces a motor with certain improved operating characteristics. These improved characteristics are especially noticeable if the positioning of the poles is such that immediately adjacent to and substantially in contact with each non-shaded pole of a given polarity is a shaded pole of opposite polarity. Such a construction will produce a starting torque as great or greater than synchronous torque and a speed torque curve of such a characteristic that at speeds immediately below synchronous speed, the torque will be greater than the synchronous torque. Consequently, when the motor is overloaded, the motor instead of stopping, will reduce its speed slightly until the torque at the reduced speed equals the load. This is of advantage where it is desired to have the clock motor operate a time controlled switch, for instance, the overload being of short duration so that the clock would lose only a fraction of a second. Furthermore, as the heaviest load on a clock motor occurs during starting, a small motor with a high starting torque is as effective as a larger motor with a comparatively low starting torque.

One of the objects of my invention is to provide an improved synchronous motor.

A further object is to provide an improved self-starting motor of light weight, low speed, long life and of simple and inexpensive construction.

Another object is to provide improved shading means for electric motors.

A still further object is to provide an improved hysteresis motor of the doughnut type with cast-metal shading.

Other objects, features and advantages will become apparent as the description proceeds, reference being hereby made to the accompanying drawings forming a part of this application, and in which like reference numerals refer to like parts.

Figure 1 is an exploded perspective view of an embodiment of my invention, certain elements being omitted for the purpose of clarity.

Figure 2 is a perspective view of the field coil.

Figure 3 is a perspective view of the rotor.

Figure 4:
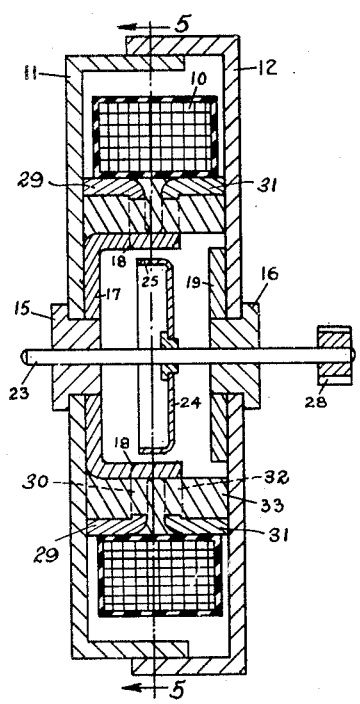
Figure 4 is a side sectional elevation of the synchronous motor illustrated in Figure 1.
Figure 5:
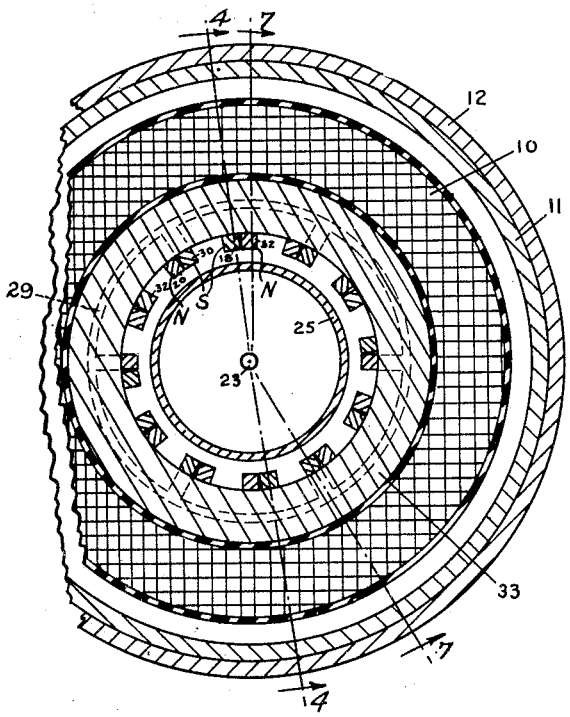
Figure 5 is a front sectional elevation of the same.

With reference to Figures 1 to 3, reference numeral 10 represents an electromagnetic winding for a synchronous motor, the winding being in the form of a doughnut-shaped coil, the adjacent layers of wires being separated by insulating means. Field housings 11 and 12 are formed of soft iron or steel and are cup-shaped in form, one being of slightly larger diameter than the other so that the two housings may be telescoped together as indicated in Figures 4 and 5, the flange of housing 12 closely fitting over the outer surface of the flange of housing 11. Conductors 13 extend from winding 10 and apertures 14 are provided in field housing 11 through which the conductors may pass to be connected to a suitable source of alternating current. Bearings 15 and 16 of non-magnetic material are suitably formed to be closely fitted into central apertures 15a and 16a in field housings 11 and 12, respectively. Disks 17 and 19 are provided to carry a series of pole pieces 18 and 20, respectively, the pole pieces extending generally at right angles from the plane of the disk, the pole pieces and the disk being of similar material to that from which the field housings are made. Apertures 21 are provided in each disk which are adapted to register with corresponding apertures 22 in each housing so that each disk may be securely riveted to its respective housing in such a manner that the surfaces of the disk and the housing are in intimate contact with each other to provide a continuous path for the magnetic flux generated by the winding. Rotor shaft 23 has affixed to it a cup-shaped rotor 24 formed from hardened steel having a high hysteresis coefficient The rotor is provided with a flange 25 which may be of a thickness approximating .015 inch, the bottom portion 26 of the cup-shaped rotor being of substantially the same thickness and being provided with a series of circular perforations 27 equidistantly positioned from the axis thereof. A pinion 28 may be secured to the shaft at a point without the housing so that power may be transmitted to clockwork.

Figure 7:
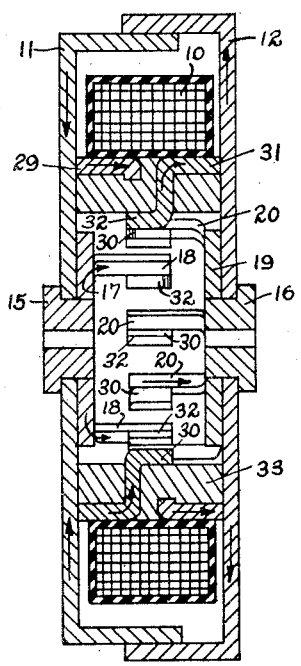
Figure 7 is a section taken along broken line 7—7 of Figure 6, all poles not intersected by the section line being omitted for the purpose of clarity.
Figure 6:
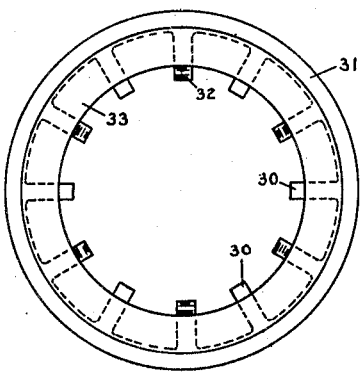
Figure 6 is an elevation of the cast-metal shading ring and the shaded poles.

Rings 29 and 31 are formed of magnetic material similar to that from which the housings are formed, each ring having a plurality of projections extending radially toward the center of the ring, the end of each projection being bent so as to extend in a direction substantially parallel to and concentric with the ring portion proper, the configuration of the ring and of the projections being shown in Figures 6 and 7. The projections will hereinafter be referred to as shaded poles 30 and 32, respectively. The two rings 29 and 31 are held adjacent each other but not touching each other with their respective shaded poles being interposed between and substantially equidistant from one another by being embedded in a cast-metal ring 33 so that for practical purposes the assembly of rings 29 and 31 and their respective poles together with the cast-metal ring 33 form one unit. Suitable screw threaded apertures 34 are formed in the cast-metal ring to register with corresponding apertures 35 formed in each field housing so that suitable studs may bring each field housing closely adjacent to and in intimate contact with each of the respective rings to form a path for the magnetic flux which passes from the field housing through the ring and to each of the shaded poles as will be hereinafter described. The casting is made of a suitable non-magnetic material of good conductivity such as an aluminum-copper alloy.

Regarding the operation it will be seen that the alternations in the supply current will create an alternating field around electromagnetic winding 10 such that the flux travels from one set of poles 18 through housings 11 and 12 to the other set of poles 20 reversing itself with each current alternation so that the polarity of each set of poles reverses itself correspondingly and at any instant the polarity of poles 18 is opposite to the polarity of poles 20. Inasmuch as a portion of the flux travels from one set of shaded poles 33 through housings 11 and 12 to the other set of shaded poles 32, poles 30 will also at any instant be of opposite polarity from poles 32, the polarity reversing itself with each alternation of the current.

The shading 33, however, in which poles 30 and 32 are embedded, will cause phase displacement of the flux which will result in the attainment by the shaded poles of their maximum flux density slightly after the corresponding unshaded poles 18 and 20 have reached their maximum density. Looking at Figure 5, the following poles will arrive at maximum flux density of a given polarity in the order given; poles 18, 30, 20, 32. This causes the field to rotate in a counterclockwise direction. It will be observed that poles 32 and 18 and poles 30 and 20 are adjacent each other, the distance separating them being of the order of .002". There is consequently a low reluctance path between each shaded pole of one polarity and an unshaded pole of opposite polarity.

If at a given instant, pole 20, for instance, is north, and pole 18 is south, a south pole will tend to be induced in the rotor opposite pole 20, and a north pole opposite pole 18. As the magnetic flux decreases in density in poles 20 and 18, due to the alternations in the current supply, the flux in shaded pole 30 will increase, the polarity therein being south, as pole 30 lags behind pole 18. Although shaded pole 30 will tend to induce a north pole in the rotor at a point opposite to it, it will also tend to repel the south pole previously induced in the rotor by pole 20, which induced pole, due to the high hysteresis coefficient of the rotor, has not decreased in strength to the same extent as pole 20. Shaded pole 30 will also tend to attract the north pole induced in the rotor by pole 18. After shaded pole 30 has reached its maximum flux density and begun to decrease, adjacent pole 28 will build up its flux density of the same polarity, in this instance, of south polarity, so that the repulsive and attractive forces which shaded pole 30 exerted on the rotor will now be continued by pole 20, the point of maximum flux density, south polarity, having shifted from pole 30 to pole 20 during the last quarter cycle.

If the rotor is rotating at synchronous speed the north pole induced in the rotor by pole 18 when it was south will be opposite pole 20 half a cycle later, that is when pole 20 has reached its maximum flux density of south polarity. If the rotor is rotating at less than synchronous speed the same attractive and repulsive forces exist, although differing in extent, and there is a greater tendency to change or shift the induced poles in the rotor.

By making the rotor of thin material the resistance to eddy currents in the rotor is increased thereby increasing the torque and efficiency of the motor.

The field housing not only provides a dust proof enclosure for the motor but also provides the flux path for the field and the structural foundation of the motor as well as completely shielding the field. The concentric arrangement of the field housing, coil, pole pieces and rotor produces a very compact and inexpensive construction and enables the employment of a thin rotor member. The shading means herein employed permits the use of the concentric construction in low speed self-starting motors, and also permits the use of two sets of shaded poles which in conjunction with the spacing disclosed produces such desirable characteristics for a clock motor.

However, although the above described embodiment of my invention because of its operating characteristics, compact construction, and low operating speed is particularly well suited for clock use, I do not limit my invention to clock motors and although the several novel features have been described in combination with each other and with a particular type of motor, it is understood that various subcombinations of the features or elements and their combinations with other types of motors, and modifications and changes in the construction and in the size, shape and proportions of the parts herein described may be effected without departing from the spirit of my invention as defined in the following claims.

I claim:

1. A synchronous motor comprising a rotor, a shading ring surrounding said rotor and concentric therewith, a plurality of pole pieces having their extremities lying parallel to the axis of said rotor and positioned between said rotor and said shading ring, alternate pole pieces having an offset portion extending at right angles to said axis and embedded in said ring, and means for energizing said pole pieces.

2. A field structure for an electric motor comprising a plurality of circularly arranged unshaded poles, two parallel spaced rings of magnetic material surrounding said unshaded poles, each ring having a plurality of polar projections extending radially toward the center thereof, and a ring-shaped shading member of non-magnetic conducting material in which said polar projections are embedded, said polar projections of each of said rings extending through said shading member and projecting from the interior surface thereof in alternating relationship with each other and with said unshaded poles.

3. A synchronous motor of the hysteresis type comprising a ring-shaped field coil, a group of shaded poles and a group of non-shaded poles associated with said field coil, the extremities of the poles of both of said groups lying in substantially the same cylindrical surface within and concentric with said field coil, said shaded poles each having an intermediate section extending outwardly at right angles to said surface, shading means positioned between said cylindrical surface and said field coil and surrounding said outwardly extending sections of said shaded poles, and a hysteresis rotor to co-operate with said poles.

4. A hysteresis type motor comprising a series of non-shaded poles, alternate members of which are of opposite instantaneous polarity, and a series of shaded poles, alternate members of which are of opposite instantaneous polarity, the faces of the poles of each of said series being positioned in the same cylindrical surface, each shaded pole being positioned adjacent an unshaded pole of opposite polarity, said shaded poles having intermediate portions projecting outwardly from one side of said surface and at right angles thereto, ring-shaped shading means positioned adjacent said surface through which said intermediate portions extend, a hysteresis rotor positioned on the inner side of said surface for co-operation with said pole extremities, and means for energizing said poles.

5. A synchronous motor comprising a housing having two substantially parallel opposite interior surfaces, a series of pole pieces extending inwardly from each of said surfaces and having faces lying in a substantially cylindrical surface, said pole pieces from each of said opposite surfaces being alternately positioned respectively, a second series of pole pieces extending inwardly from each of said interior surfaces in alternating relationship and surrounding said first series, the pole pieces of said second series being formed to extend towards and interfit with the pole pieces of said first series, the faces of said pole pieces of said second series lying in said cylindrical surface, cast metal ring-shaped shading means co-axial with and surrounding said cylindrical surface and embedding portions of said pole pieces of said second series, an energizing coil positioned within said housing and surrounding said second series of pole pieces, and a rotor for co-operation with said pole pieces.

6. An article of manufacture comprising a cast-metal ring-shaped structure of non-magnetic material, a ring-shaped member of magnetic material, said members being telescoped so that a portion of said non-magnetic structure lies within said magnetic member and one side edge of said magnetic member is substantially flush with a side edge of said non-magnetic structure, and a plurality of projections at the other side edge of said magnetic member bent inwardly and extending through said non-magnetic structure and projecting from the interior surface thereof.

7. A composite unitary shaded pole field element for an electric motor comprising two parallel spaced ring-shaped magnetic members each having a plurality of radially extending polar projections, the extremities of all of said projections having faces lying in the same cylindrical surface, and a cast body of non-magnetic conducting material embedding the radially extending portions of said projections and completely filling the space between said ring-shaped members and the cylindrical surface defined by the faces of said polar projections.

JOSEPH A. REINHARDT.